April 15, 1969     D. E. ENGLEMAN     3,438,117
METHOD OF MAKING A SEALING GASKET
Filed Oct. 25, 1966
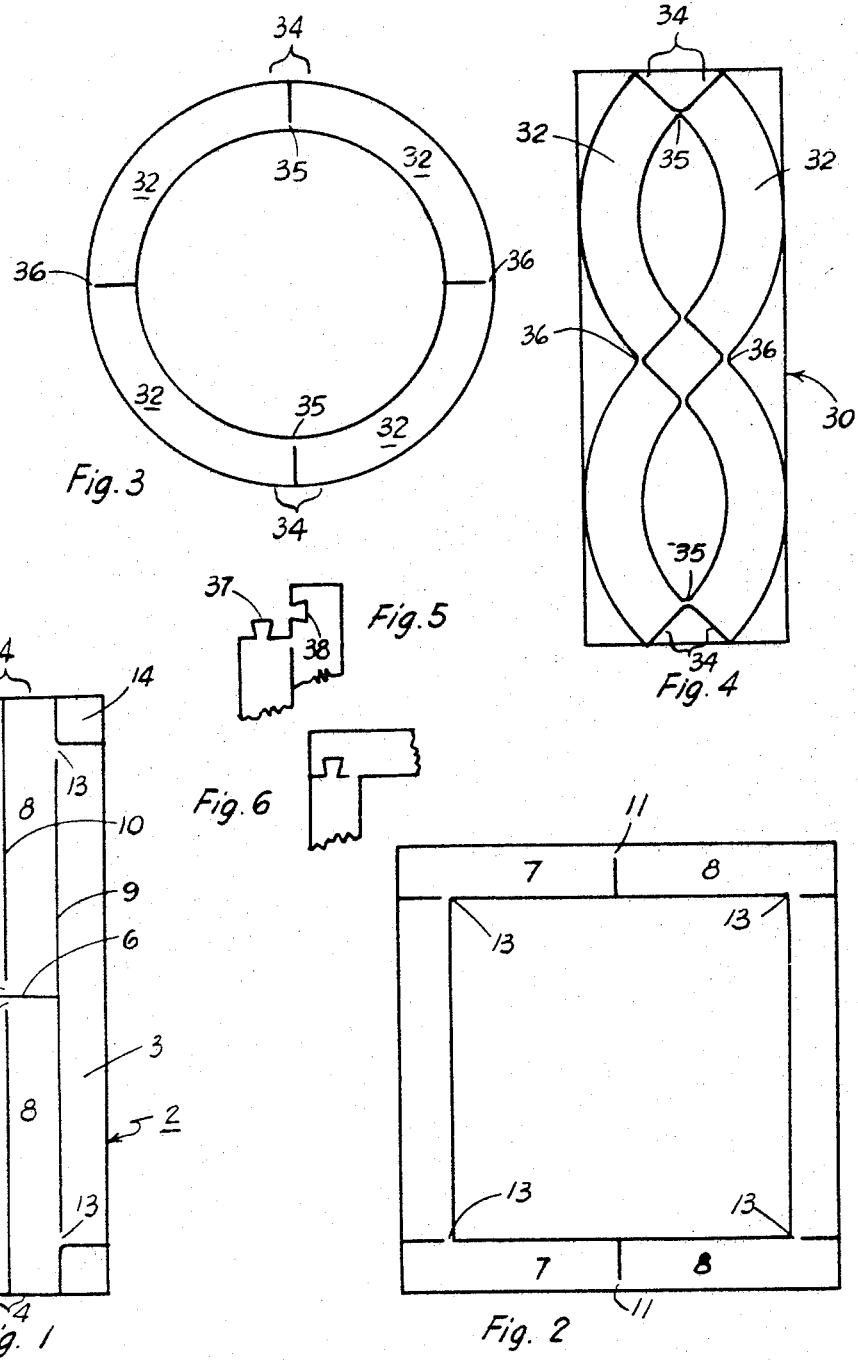
INVENTOR.
Donald E. Engleman
BY
Ralph C. Brick United States Patent Office 3,438,117
Patented Apr. 15, 1969

3,438,117
METHOD OF MAKING A SEALING GASKET
Donald E. Engleman, Louisville, Ky., assignor to American Air Filter Company, Inc., Louisville, Ky., a corporation of Delaware
Filed Oct. 25, 1966, Ser. No. 589,427
Int. Cl. B23p 11/02; B29c 17/08; B29h 3/06
U.S. Cl. 29—450  5 Claims

ABSTRACT OF THE DISCLOSURE

An improved gasket and method of forming the same wherein longitudinal sections of preselected gasket shape are formed in compact, adjacent relationship from gasket material in such a manner that the sections are integrally joined at preselected points, the sections then being pivotally expanded to form the endless gasket of preselected contour.

---

The present invention relates to a method of making sealing gaskets and more particularly to a method of making an endless flow-through sealing gasket.

Numerous arrangements and methods of making sealing gaskets of an endless flow-through type are known in the art. By and large, these past arrangements and methods of making the same have required many parts and steps in manufacturing operations and have utilized substantial quantities of material with substantial concomitant waste. Further, the resulting gaskets produced by past manufacturing processes have not always adequately satisfied sealing conditions which they were designed to meet because of frequent fluid leakage and rupture occurrences. In accordance with the present invention, a straight-forward, economical and efficient sealing gasket is provided which can be readily formed in various geometric configurations and sizes by the method of the present invention with a minimum of steps and with a minimum utilization of materials. Further, the present invention provides a sealing gasket which affords continuous envelopment of the member being sealed to avoid fluid leakages and rupture. Moreover, the sealing gasket of the present invention can be stored and shipped in compact form and easily arranged for installation when required. Although the gasket of the present invention finds particular utility as a fluid sealant in high efficiency particulate filters, it is to be understood that the method and apparatus disclosed herein can be employed with gaskets destined for use in other arts.

Various other features of the present invention will become obvious to one skilled in the art upon reading the disclosure set forth hereinafter.

More particularly, the present invention provides a method of making an endless sealing gasket of preselected geometric contour from a sheet of gasket material comprising the steps of forming longitudinally extending sections of a contour conforming with the final preselected geometric contour of the gasket in the sheet of gasket material, with the sections being in compact adjacent relationship and with each longitudinally extending section being integrally joined to an adjacent longitudinally extending section through a corner on the extremity of one section attached at a preselected position on the other section with the remainder of such one extremity being free; removing the formed connected sections from the remainder of the blank; and pivotally expanding the connected sections about the joined corners so that the free extremities of the sections are brought into substantially full abutting engagement with adjacent longitudinal sections to which they are connected to form the endless sealing gasket of preselected geometric contour. Further, the present invention provides an endless sealing gasket of preselected geometric contour comprising a plurality of longitudinally extending sections disposed in end-to-end relationship with each longitudinally extending section being integrally joined to an adjacent longitudinally extending section by a corner on the extremity of one section attached to the preselected position on the other section, with the remainder of such one extremity being free for movement.

It is to be understood that various changes can be made in the arrangement, form, and construction of the sealing gasket disclosed herein and in the several steps of the method described herein without departing from the scope or spirit of the present invention.

Referring to the drawing which discloses an advantageous embodiment of the present invention and a further modification thereof:

FIGURE 1 is a plan view of a sheet of gasket material with the sections of the inventive gasket formed thereon, the sections being of a contour conforming with a final endless sealing gasket of preselected rectangular contour;

FIGURE 2 discloses the gasket of FIGURE 1 in expanded state to provide the rectangular flow-through gasket with continuous sealing capability;

FIGURE 3 is a plan view of a sheet of gasket material with the sections of the inventive gasket formed thereon, the sections being of a contour conforming with a final endless sealing gasket of preselected circular shape;

FIGURE 4 discloses the gasket of FIGURE 3 in expanded state to provide the circular flow-through gasket with continuous sealing capability;

FIGURE 5 is a segmental view of a corner portion of the gasket of FIGURES 1 and 2 disclosing how such a gasket can further include a tongue and groove arrangement to effect more thorough continuous sealing; and FIGURE 6 discloses the structure of FIGURE 5 in assembled position.

Referring to FIGURES 1 and 2 of the drawing, a suitable sheet of gasket material 2, sized in accordance with the sealing gasket contemplated, is utilized. Sheet 2 can be selected from any one of a number of suitably flexible gasket materials known in the art, such as natural or synthetic rubber, or a synthetic composition of plastic.

In making the gasket from sheet 2, there is formed in the sheet a plurality of longitudinally extending sections in parallel, side-by-side relation. These sections include a pair of outer longitudinally extending sections 3 and two sets of intermediate longitudinally extending sections 4 disposed between outer sections 3 in end-to-end relation, the intermediate sections 4 being separated from each other by cut 6. Each set of sections 4 includes two parallel side-by-side longitudinally extending sections 7 and 8, these side-by-side sections being separated from sections 3 by cuts 9 and being separated from each other by cut 10. It is to be noted that in the embodiment disclosed, sections 7 and 8 of the section sets 4 are each a little more than half as much in length than the length of sections 3, so that the difference in length between the sum of the two aligned sections 7 or the sum of the two aligned sections 8 as compared to the length of section 3 is substantially equal to twice the breadth of the sections. In this connection it also is to be noted that all of the sections are of substantially the same breadth so as to provide a uniform endless gasket when fully expanded.

Each of adjacent sections 7 and 8 of each section set 4 are integrally joined to each other at adjacent corners as indicated by reference numeral 11, these joined corners being located at the inner extremities of section sets 4. One outer section 3 is joined at opposite end corners at preselected points on aligned sections 7 and the other outer section 3 is joined at opposite end corners at preselected points on aligned sections 8. It is to be noted that these preselected points of juncture of outer sections 3 to aligned sections 7 and aligned sections 8, respectively, are designated by reference numeral 13, the points being located a distance from the outer extremities of section sets 4 equal to the breadth of one of such equal breadth sections. It also is to be noted that corner portions 14 of blank 2 are removed to permit free movement of sections 7 and 8 relative the sections 3.

In setting up blank 2 of FIGURE 1, it only is necessary to pull sections 3 away from each other. This, in turn, causes sections 7 and 8 to pivot about corner junction 11 to form opposed sides 7–8 (FIGURE 2). In like manner, sections 7 and 8 pivot about corner junctures 13 to form the right angle corners of the rectangular gasket.

Referring to FIGURES 3 and 4 of the drawing which disclose a gasket of endless curved shape, a suitably shaped blank 30 is utilized to include curved sections 32 formed in at least two longitudinally aligned sets 34 with side-by-side sections 32 of each set 34 being disposed in substantially mirror-image relationship to each other. It is to be noted that in the disclosure of FIGURE 3, curved side-by-side sections 32 of each set 34 are joined to each other at the inner corners of the outer extremities of the two pair of adjacent corners, the junctured corners being indicated by reference numerals 35. It further is to be noted that the aligned sets 32 of longitudinally aligned sets 34 are joined to each other at the outer adjacent corners, the junctured corners being indicated by reference numerals 36. Thus, the juncture corners 35 and 36 are alternately positioned adjacent the inner and outer perimeters of the curved gasket when the gasket is extended as disclosed in FIGURE 4.

To insure an effective continuous sealing of the gaskets such as disclosed in FIGURES 1 to 4 of the drawings, it is further possible to provide at the junctured extremities of the sections a dovetail arrangement including tongue 37 and groove 38, which, when the longitudinally extending sections are pivoted about the corners, engage to further insure proper sealing.

The invention claimed is:

1. A method of making an endless sealing gasket preselected geometric contour from a sheet of gasket material comprising the steps of forming longitudinally extending sections of a contour conforming with the final preselected geometric contour of said gasket in said sheet of gasket material with said sections being in compact adjacent relationship and with each longitudinally extending section being integrally joined to an adjacent longitudinally extending section through a corner on the extremity of one section attached at a preselected position on the other section, with the remainder of such one extremity being free; removing said formed connected sections from the remainder of said blank; and pivotally expanding said connected sections about the joined corners so that the free extremities of said sections can be brought into substantially full abutting engagement with the adjacent longitudinal sections to which they are connected to form the endless sealing gasket of preselected geometric contour.

2. The method of claim 1 wherein said longitudinally extending sections are formed from said blank in parallel side-by-side relationship to include a pair of longitudinally extending outer sections and two sets of intermediate sections, disposed between said outer section in end-to-end relation with each set including at least two parallel side-by-side sections.

3. The method of claim 1 wherein a tongue-and-groove arrangement is formed in said respective longitudinally extending section adjacent said joining corners.

4. The method of claim 1 wherein certain of said longitudinally extending sections are formed from said blank as curved segments in at least two sets with the segments of each set being disposed in substantially mirror-image relationship to each other.

5. The method of claim 4, wherein said sets are disposed in end-to-end relationship.

References Cited

UNITED STATES PATENTS

| | | | |
|---|---|---|---|
| 164,444 | 6/1875 | Grilley | 277—221 X |
| 1,908,072 | 5/1933 | Spang | 29—417 |
| 1,986,465 | 1/1935 | Dempsey | 277—199 |
| 2,153,414 | 4/1939 | Dodge | 264—152 |
| 2,255,504 | 9/1941 | Current. | |
| 2,900,667 | 8/1959 | Longenecker | 264—153 X |
| 3,231,289 | 1/1966 | Carrell | 277—222 X |

FOREIGN PATENTS 1,112,037  8/1961  Germany.

CHARLIE T. MOON, *Primary Examiner.*

U.S. Cl. X.R.

29—453; 83—32; 113—116; 264—153, 339; 277—199